(12) United States Patent
Braunbeck et al.

(10) Patent No.: US 7,926,868 B2
(45) Date of Patent: Apr. 19, 2011

(54) ENERGY ABSORBING ELEMENT AND MOTOR VEHICLE BODY USING THE SAME

(75) Inventors: Bardo Braunbeck, Oppenheim (DE); Theobald Hock, Grossostheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 11/916,157

(22) PCT Filed: Jun. 22, 2006

(86) PCT No.: PCT/EP2006/005995
§ 371 (c)(1),
(2), (4) Date: Nov. 30, 2007

(87) PCT Pub. No.: WO2006/136405
PCT Pub. Date: Dec. 28, 2006

(65) Prior Publication Data
US 2008/0217935 A1    Sep. 11, 2008

(30) Foreign Application Priority Data
Jun. 24, 2005   (DE) .................. 10 2005 029 738

(51) Int. Cl.
*B60R 19/34* (2006.01)
(52) U.S. Cl. .................. 296/187.03; 293/132; 293/133; 293/155
(58) Field of Classification Search .......... 293/132, 293/133, 154, 155; 296/187.03, 187.09, 296/187.11; 188/371, 377
See application file for complete search history.

(56) References Cited

U.S. PATENT DOCUMENTS

| | | | | |
|---|---|---|---|---|
| 4,429,914 A * | 2/1984 | Bez et al. | | 296/187.03 |
| 4,599,843 A * | 7/1986 | Ingvarsson | | 296/146.6 |
| 5,462,144 A * | 10/1995 | Guardiola et al. | | 188/377 |
| 5,579,699 A * | 12/1996 | Dannawi et al. | | 105/416 |
| 5,611,568 A | 3/1997 | Masuda | | |
| 5,660,116 A | 8/1997 | Dannawi et al. | | |
| 5,715,757 A * | 2/1998 | Dannawi et al. | | 105/392.5 |
| 5,727,827 A * | 3/1998 | Shibuya et al. | | 293/155 |
| 5,803,514 A * | 9/1998 | Shibuya et al. | | 293/133 |
| 5,934,544 A * | 8/1999 | Lee et al. | | 228/146 |
| 6,371,541 B1 | 4/2002 | Pedersen | | |
| 6,502,874 B2 * | 1/2003 | Kajiwara et al. | | 293/133 |
| 6,523,873 B1 * | 2/2003 | Summe et al. | | 293/133 |
| 6,684,505 B2 * | 2/2004 | Sundgren et al. | | 29/897.2 |

(Continued)

FOREIGN PATENT DOCUMENTS

DE    19540787 A1    5/1997

(Continued)

OTHER PUBLICATIONS

Chinese Patent Office, Chinese Office Action for Chinese Application No. 200680015004.0, Jan. 9, 2009.

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

An energy absorbing element for a motor vehicle body comprises a tube section that is roll-formed from a steel strip. The cross-section of the tube section has at least one concavity.

6 Claims, 4 Drawing Sheets

U.S. PATENT DOCUMENTS

| | | | |
|---|---|---|---|
| 6,688,237 B2 | 2/2004 | Baeck et al. | |
| 6,779,821 B2 * | 8/2004 | Hallergren | 293/133 |
| 6,918,621 B2 * | 7/2005 | Seksaria | 293/133 |
| 6,923,482 B2 * | 8/2005 | Cumming et al. | 293/102 |
| 6,948,749 B2 * | 9/2005 | Graber | 293/102 |
| 7,066,508 B1 * | 6/2006 | Baccouche et al. | 293/120 |
| 7,077,442 B2 * | 7/2006 | Arns | 293/155 |
| 7,182,393 B2 * | 2/2007 | Guiles | 296/146.6 |
| 7,210,717 B1 * | 5/2007 | Baccouche et al. | 293/102 |
| 7,252,314 B2 * | 8/2007 | Tamura et al. | 293/133 |
| 7,257,314 B2 * | 8/2007 | Asada et al. | 386/94 |
| 7,357,432 B2 * | 4/2008 | Roll et al. | 293/133 |
| 7,401,825 B2 * | 7/2008 | Frank et al. | 293/155 |
| 7,503,601 B2 * | 3/2009 | Agrahari | 293/102 |
| 2003/0151273 A1 | 8/2003 | Sakamoto et al. | |
| 2005/0099027 A1 * | 5/2005 | Seksaria | 293/133 |
| 2005/0253403 A1 * | 11/2005 | Longo | 293/133 |
| 2007/0176442 A1 * | 8/2007 | Mori et al. | 293/133 |
| 2007/0176443 A1 * | 8/2007 | Yasuhara et al. | 293/133 |
| 2008/0238142 A1 * | 10/2008 | Braunbeck et al. | 296/187.03 |

FOREIGN PATENT DOCUMENTS

| | | | |
|---|---|---|---|
| DE | 69404205 | T2 | 11/1997 |
| DE | 19751513 | A1 | 6/1999 |
| DE | 19847389 | A1 | 4/2000 |
| DE | 20121532 | U1 | 11/2002 |
| DE | 69904042 | T2 | 10/2003 |
| DE | 102005029738 | A1 | 12/2006 |
| EP | 0637538 | A1 | 2/1995 |
| EP | 0856681 | A1 | 8/1998 |
| EP | 1293415 | A1 | 3/2003 |
| EP | 1384536 | A2 | 1/2004 |
| FR | 2698932 | A1 | 6/1994 |
| GB | 548897 | A | 10/1942 |
| WO | 0160676 | A1 | 8/2001 |
| WO | WO2005010398 | A1 * | 2/2005 |

OTHER PUBLICATIONS

German Patent Office, German Search Report for German Application No. 102005029738.2, Feb. 2, 2006.

International Bureau, PCT Search Report for PCT Application No. PCT/EP2006/005995, Sep. 22, 2006.

Russian Patent Office, Russian Office Action for Russian Application No. 2007140684, Nov. 1, 2007.

* cited by examiner

Fig. 1
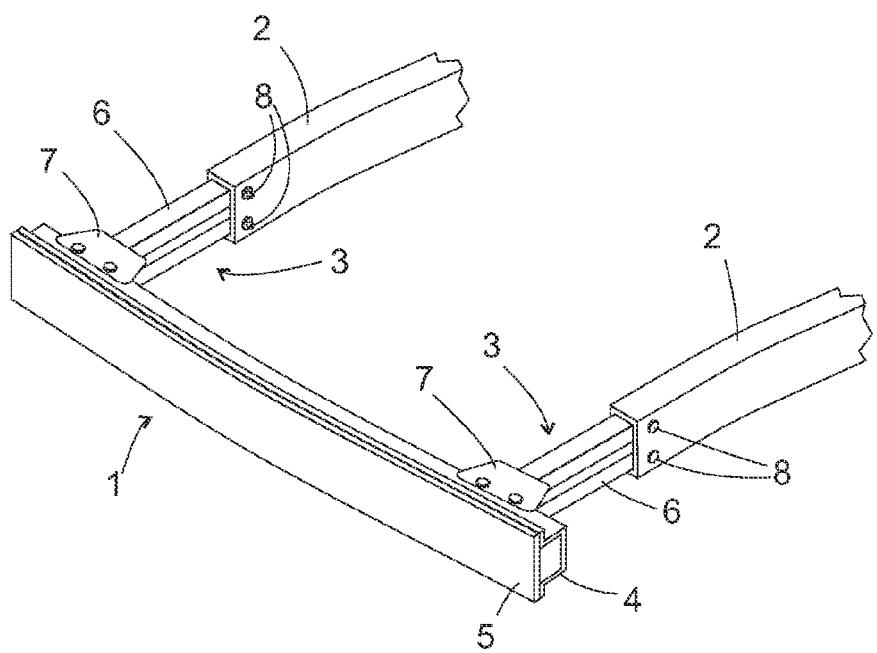
Fig. 2
Fig. 3
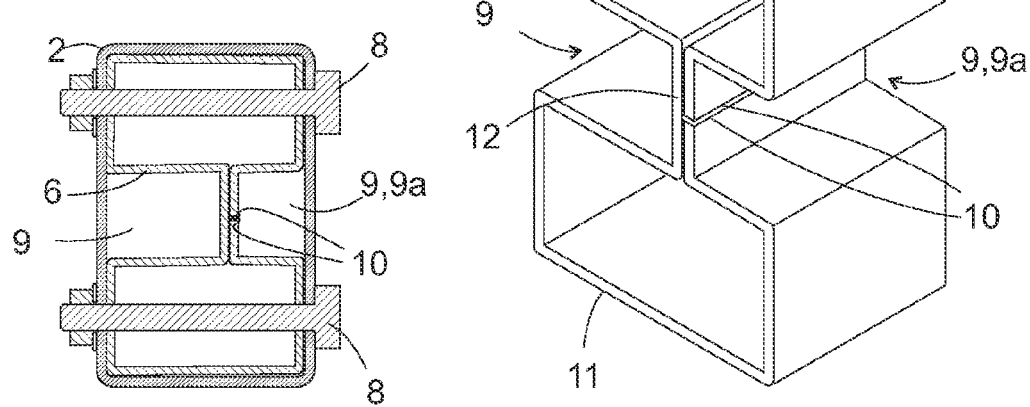

ENERGY ABSORBING ELEMENT AND MOTOR VEHICLE BODY USING THE SAME

CROSS-REFERENCE TO RELATED APPLICATIONS

This application is a U.S. National-Stage entry under 35 U.S.C. §371 based on International Application No. PCT/EP2006/005995, filed Jun. 22, 2005, which was published under PCT Article 21(2) and which claims priority to German Application No. DE 10 2005 029 738.2, filed Jun. 24, 2005.

TECHNICAL FIELD

This invention relates to an energy absorbing element and a motor vehicle body in which it is used.

BACKGROUND

Energy absorbing elements, often called crash boxes, which connect the longitudinal and cross members of a motor vehicle frame are known from various sources. DE 197 51 513 A1 describes a crash box obtained from a rectangular, longitudinally welded aluminum tube by means of cutting slots into the ends of the tube, and the tongues thus obtained being bent over to obtain contact surfaces for large-area support of the crash box on a member of the frame. This technique is essentially specified for tubes with a rectangular cross-section because the greater the number of corners of the tubular cross-section, the greater the number of slots which must be cut to be able to bend the tongues, and their required bending processes. Moreover, for non-rectangular cross-sections, the problem may result that the bent tongues cannot be readily placed on the member on which they are to rest in support.

From DE 201 21 532 U1, an energy absorbing element is known in which a tube section of aluminum or steel of a rectangular cross-section is filled with polyurethane foam to stiffen it. Although reference is made to the low weight of the polyurethane foam, it is evident that any stiffening of the energy absorbing element realized through its use will inevitably also result in weight and cost increases.

SUMMARY

It is the objective of this invention to provide an energy absorbing element which realizes high rigidity with small cross dimensions and low material and cost expenditures.

The problem is solved by an energy absorbing element with a tube section in which the cross-section of the tube section has at least one concavity. The additional, more or less rounded edges resulting from the concavity have a stiffening effect without requiring an increase in cross dimensions of the energy absorbing element and without the need to increase the cross-sectional wall surface of the tube section and thus the utilized material quantity and the weight.

To be able to economically produce the energy absorbing element from steel, the tube section is expediently a section of a profile which is roll-formed from a steel strip.

For stiffening, the edges of the steel strip are expediently welded together.

The weld seam is preferably provided in the concavity so that any possible non-uniformities and projections of the weld seam will not obstruct the installation of the energy absorbing element.

As a result of the concavity, the side walls of the tube section are longer in cross-section than an imaginary thread looped around the cross-section which connects the farthest outlying points of the cross-section without dipping into the concavity. The length of the side walls of the tube section is preferably longer by at least one quarter than the length of the thread.

A comparatively simple but effective cross-sectional form of the tube section to obtain rigidity are two hollow profiles connected by a web.

A mounting flange for connecting the energy absorbing element with a vehicle body part is expediently welded to a longitudinal end of the tube section.

In a motor vehicle body, the energy absorbing element is preferably arranged between a longitudinal member and a cross member of the body, extending in the vehicle's longitudinal direction, to be able to yield in case of a head-on collision at low speed and protect the longitudinal member from deformation.

The energy absorbing element can be mounted in a motor vehicle body in a simple and safe manner by pushing one longitudinal end of the tube section into an open end of a tubular vehicle body part, in particular a longitudinal member. It can be supported in the tubular body part by at least one pin element—such as a rivet or a screw—crossing the vehicle body part.

Alternatively, flange plates can be screwed together which are fastened on respectively facing ends of the longitudinal member and the energy absorber.

BRIEF DESCRIPTION OF THE DRAWINGS

The present invention will hereinafter be described in conjunction with the following drawing figures, wherein like numerals denote like elements, and FIG. 1 shows a perspective view of a cross member of a motor vehicle body, said member being connected with two longitudinal members via two energy absorbing elements according to the invention;

FIG. 2 shows an enlarged presentation of a tube section of the energy absorbing element;

FIG. 3 shows a section through the energy absorbing element and a longitudinal member accepting it;

DETAILED DESCRIPTION OF THE INVENTION

Figure 4:
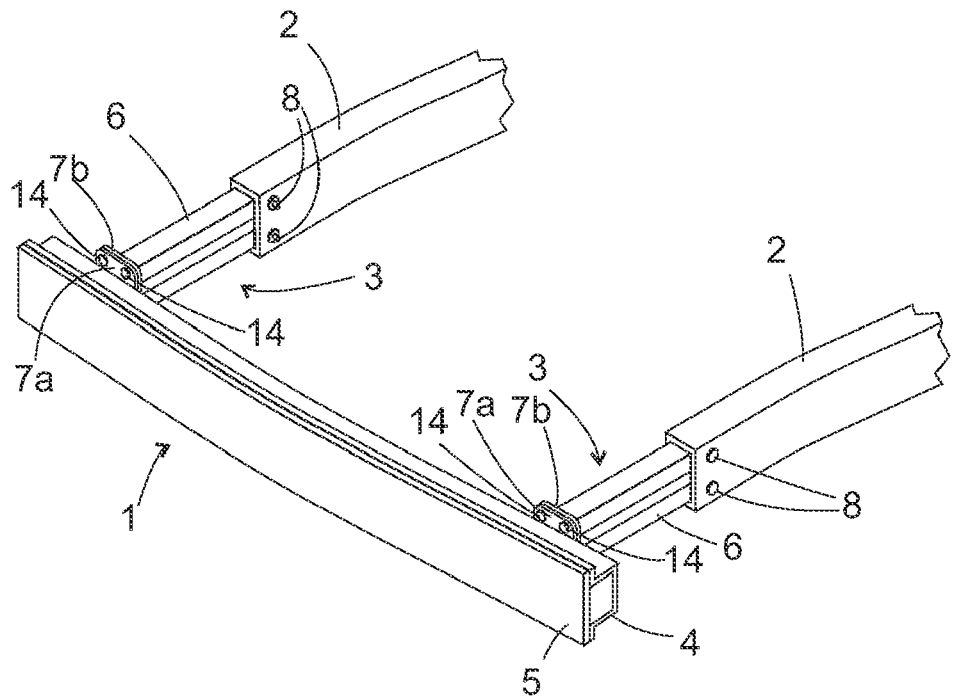
FIG. 4 shows an alternative embodiment of the cross member and the energy absorbing elements acting upon it.

The following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 is a partial schematic view of a frame of a motor vehicle body with a cross member 1 and two longitudinal members 2 partially shown which are connected to each other via energy absorbing elements 3. The cross member 1 is combined of two metal plates 4, 5, the inner plate 4 being formed in an approximately U-shaped cross-section with edge webs protruding to the top and bottom, and the essentially planar outer plate 5 covering up the open side of the U-shaped cross-section and being welded on the protruding edges. For simplicity's sake, the longitudinal members 2 are shown as tubes with a rectangular cross section; however, they may be welded together from individual sheets in the same manner as the cross member 1.

The energy absorbing elements 3 each comprise a tube section 6 which is obtained by roll-forming a steel strip to a hollow section and separating one piece from this hollow section. Two mounting flanges 7 each—only one each to be seen in FIG. 1—are welded to one end of the tube sections 6. The mounting flanges 7 each rest against the upper and lower leg of the U-shaped cross-section of the metal plate 4 of cross member 1 and are held to it by means of screws.

The rear ends of the tube sections 6 are each pushed into the longitudinal members 2 and fastened in them by means of screws 8 which each extend through bores in the walls of the longitudinal member 2 and the tube section 6 inserted therein.

FIG. 3 shows a section through a longitudinal member 2 and the tube section 6 fitting therein at the level of screw 8.

As seen in FIGS. 2 and 3, the cross-sectional shape of the tube section 6 can be considered derived from a basic rectangular shape, with one concavity each—in the shape of a groove 9 with a rectangular cross-section—formed in the two longitudinal sides of the rectangle. The bottoms of the two grooves 9 touch each other; and on the bottom of one of the two grooves 9—designated 9a—the edges 10 of the steel strip will meet of which the tube section 6 is roll-formed so that a cross-sectional shape results of two rectangular hollow profiles 11, connected by a double-walled web 12. The edges 10 are welded together and to the bottom of the opposite groove 9. Thus, the weld being localized on the bottom of groove 9a has the advantage, on the one hand, that the edges 10 can be connected with each other and with the bottom of the opposite groove 9b in one single work step which lends greater rigidity to the tube section 6 than if these bottoms were unconnected with each other. On the other hand, due to the location of the weld seam in groove 9a, any protrusions possibly resulting during welding will not obstruct a close-fitting insertion of the tube section 6 into the longitudinal member 2.

The length of the wall of tube section 6 in the cross-section, i.e. the width of the steel strip from which the tube section 6 is formed is longer by double the length of one narrow side than the length of an imaginary thread looped around the tube section 6. At a ratio of the side lengths of the basic rectangular form of e.g. 1 to 1.5, that means the wall length is approx. 40% longer than the length of the thread. To accommodate this great wall length, a multiple folded cross-sectional structure is required with a total of 12 edges instead of four with a simple rectangular cross-section; and this structure will result in an improved rigidity compared with the rectangular cross-section even if the cross-sectional wall surface—and thus the applied material quantity and the weight of the tube section according to the invention—is not larger than that of the simple rectangular profile.

FIG. 4 shows an alternative embodiment of the cross member 1 and the energy absorbing elements 3 mounted thereon. The horizontal flanges 7 of FIG. 1 are here replaced by two vertical flanges 7a, 7b, one of which, 7a, is welded onto the U-shaped metal plate 4 of the cross member 1, and the other one onto one end of one of the energy absorbing elements 3 and held together by screws 14.

Figure 5:
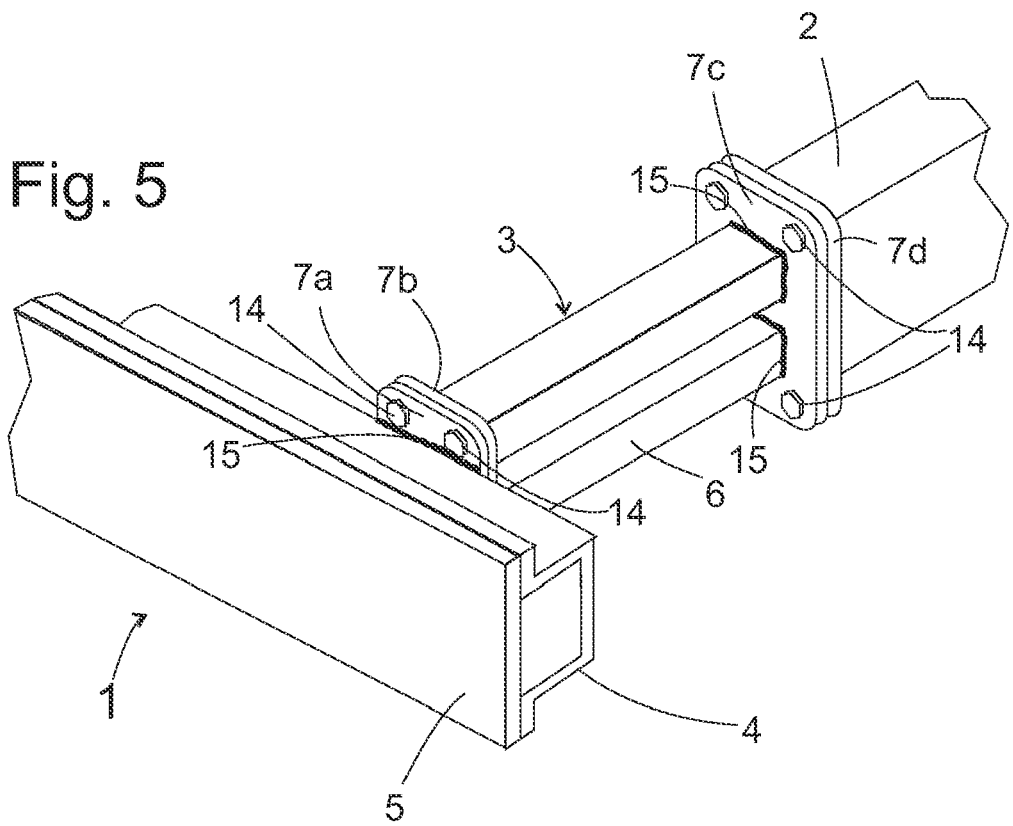
FIG. 5 shows another alternative embodiment of the cross member and an energy absorbing element acting upon it.

In an enlarged partial view, FIG. 5 shows another alternative embodiment of the cross member 1 and of one of the energy absorbing elements 3 fastened thereto. The energy absorbing element 3 is fastened to the cross member 1, as shown in FIG. 4, by two vertical flanges 7a, 7b screwed together. The energy absorbing element 3 here does not engage in the longitudinal member 2, but the respectively facing ends of the energy absorbing element 3 and longitudinal member 2 are each closed by a welded-on flange plate 7c or, respectively, 7d, connected by screws 14, like the flange plates 7a, 7b. Weld seams between the U-shaped metal plate 4 and the flange plate 7a or, respectively, between the energy absorbing element 3 and the flange plate 7c are designated with 15.

Figure 6:
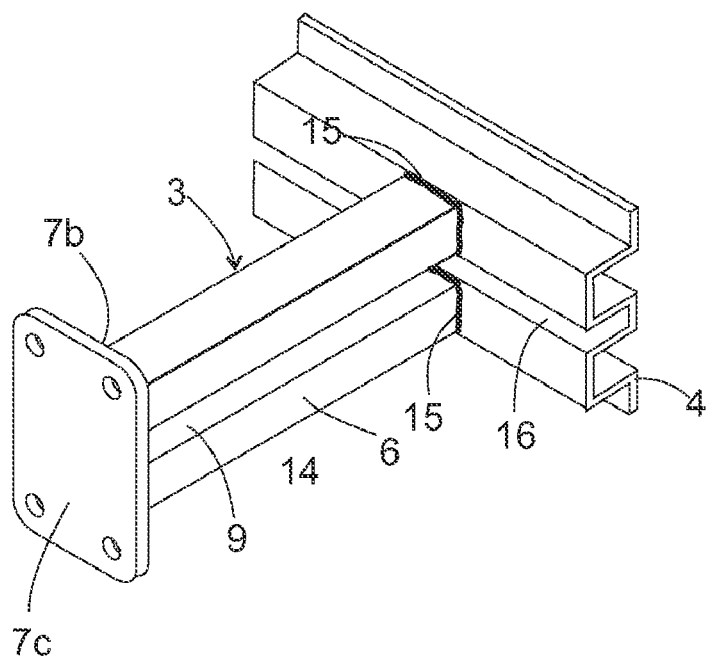
FIG. 6 shows a once more modified embodiment of the cross member and an energy absorbing element acting upon it.

As FIG. 6 shows, the connection via flanges 7 or 7a, 7b between the energy absorbing element 3 and the cross member 1 can also be replaced by direct welding with weld seams 15.

The inner metal plate 4 of the cross member here has no simple U-profile as in the above considered embodiments but a double U-profile for reason of increased rigidity, with the grooves 9 of the energy absorbing element 3 being in alignment with an interspace 16 between two U-profile webs of the inner metal plate 4. Such a double U-profile can, of course, also be combined with the above described embodiments.

Figure 7:
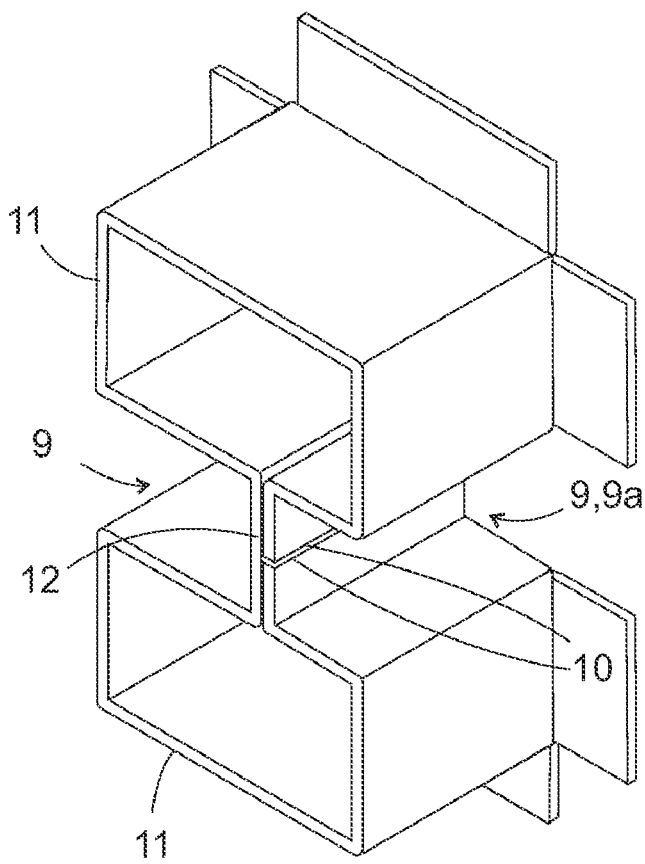
FIG. 7 shows a variant of the energy absorbing element.

The flanges 7b or 7c welded onto the tube section 6 of the energy absorber 3 may also be replaced by flanges 7' which—as shown in the partial view of an energy absorbing element in FIG. 7—are obtained by slitting the tube section 6 along its edges and bending them at a right angle.

Figure 8:
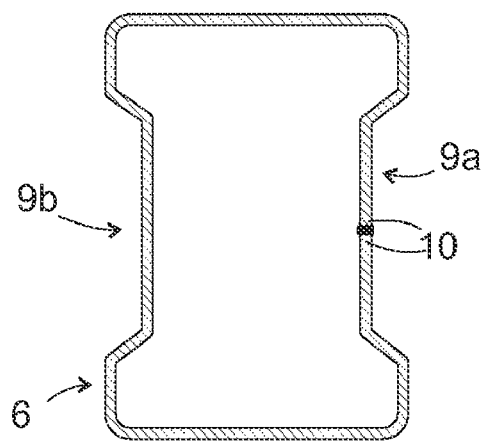
FIGS. 8-11 show alternative cross-sections of the tube section of the energy absorbing element according to the invention.
Figure 9:
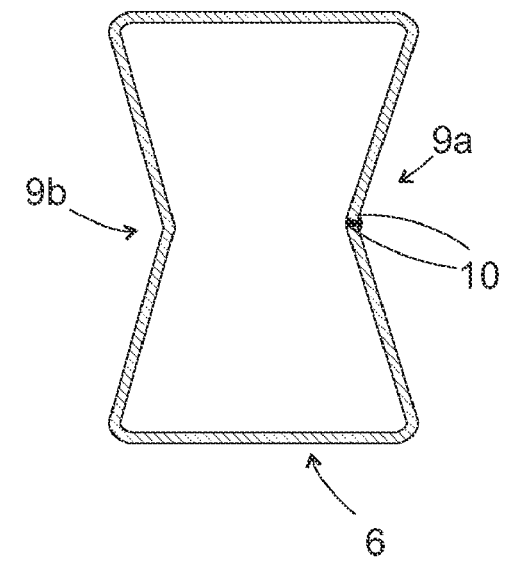
Figure 10:
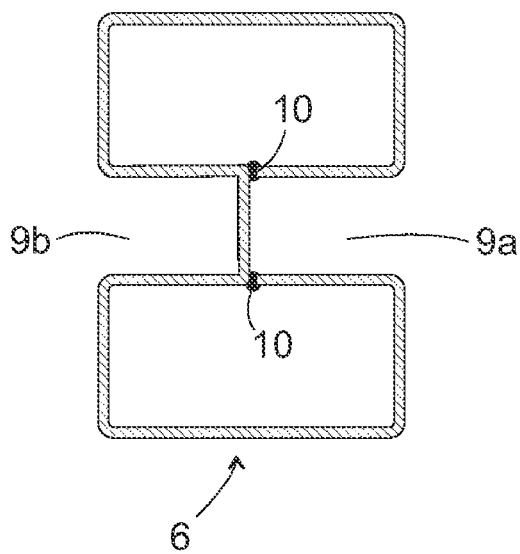
Figure 11:
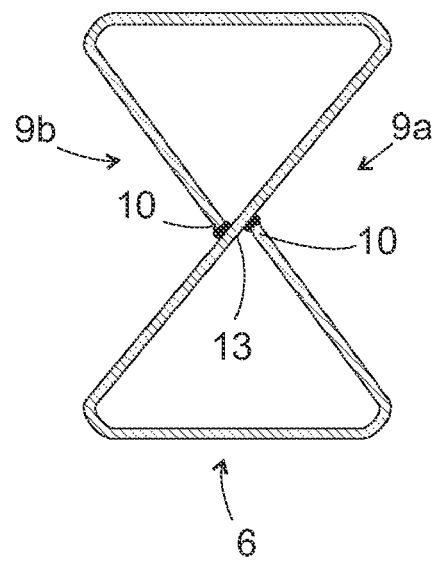

Numerous alternative cross-section forms of the tube section 6 are of course conceivable within the scope of the invention; for example, one with flat grooves 9, 9a which do not touch each other, as shown in FIG. 8; a tapered cross-section form as in FIG. 9, or the cross-section form of FIG. 10 which is essentially identical with that of FIGS. 2 and 3, except for the fact that—for weight-saving purposes—the edges 10 are not welded together on the bottom of groove 9a, but each alone by itself with the bottom of the opposite groove 9b. An S-shaped cross-sectional form is also possible, as shown in FIG. 11, in which the edges 10 are each welded coming from different sides onto a central area 13 of the metal plate strip. Even a rectangular cross-section known per se can, of course, be presented by roll-forming a metal plate strip.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. An energy absorbing element for a motor vehicle body of the type that includes a cross-member and a longitudinal member, the energy absorbing element comprising:
   a tube section adapted to be mounted between the cross-member and the longitudinal member, the tube section formed from a single metal strip and including: (i) a first generally rectangular hollow profile, (ii) a second generally rectangular hollow profile, and (iii) a double-walled web between the first generally rectangular hollow profile and the second generally rectangular hollow profile and cooperating therewith to define two longitudinal grooves each having a generally rectangular cross-sectional shape; and at least one weld seam joining the opposing longitudinal edges along the double-walled web.

2. The energy absorbing element according to claim 1, wherein the tube section comprises roll-formed steel.

3. The energy absorbing element according to claim 1, wherein the tube section has more than four edges in cross-section.

4. The energy absorbing element according to claim 1, wherein a mounting flange is welded onto a longitudinal end of the tube section for connection with a vehicle body part.

5. The energy absorbing element according to claim 1, wherein at a longitudinal end of the tube section a mounting flange is bent at an angle in one piece for connection with a vehicle body part.

6. A body of a vehicle, comprising:

a cross-member;

a longitudinal member; and an energy absorbing element mounted between the cross-member and the longitudinal member, the energy absorbing element comprising:

a tube section formed from a single metal strip and having: (i) a first generally rectangular hollow profile, (ii) a second generally rectangular hollow profile, and (iii) a double-walled web between the first generally rectangular hollow profile and the second generally rectangular hollow profile and cooperating therewith to define two longitudinal grooves each having a generally rectangular cross-sectional shape; and a weld seam joining opposing longitudinal edges of the tube section together along the double-walled web.

* * * * *